Patented June 8, 1948

2,443,142

UNITED STATES PATENT OFFICE 2,443,142

AMBER GLASS AND BATCH COMPOSITION FOR MAKING SAME

Aaron K. Lyle, West Hartford, Conn., assignor to Hartford-Empire Company, Hartford, Conn., a corporation of Delaware No Drawing. Application August 29, 1944, Serial No. 551,779

5 Claims. (Cl. 106—52)

This invention relates to amber glass and has particular relation to amber glass of the reduced or carbon-sulfur type.

Objects of the invention are to produce novel amber glass having unusual color stability; to provide stable reduced amber glass in an extraordinarily wide range of color intensity; to provide such glass with a pleasing coloration; to provide such glass of good chemical durability; and to provide a novel batch composition and a novel process whereby difficulties in melting and fining, such as blistering and foaming, are overcome in the production of the novel glass.

Prior amber glass of the reduced or carbon-sulfur type is notoriously unstable and such stability as is attained is often transitory. This is to be expected from the combustibility of the basic coloring materials, carbon and sulfur. Consequently, such glass, which is properly colored when partially melted, may lose color and may blister and foam as melting and fining proceeds and may become unfit for use if held very long at high temperatures.

Therefore it has been necessary prior to this invention to add iron as iron oxide or iron sulfide in substantial amounts to prior amber glass batches to increase their stability and to eliminate blisters and foam. Iron sulfide is customarily used for this purpose. Consequently, prior amber glass usually contains 0.20% or more iron expressed as $Fe_2O_3$.

While such additions of iron are beneficial in some respects, the advantages are largely offset by certain disadvantages and such use of iron does not solve the problem satisfactorily. The glass still may be too unstable to permit the production of light shades of amber and when this is attempted, the resulting glass has an unattractive, dull, green-yellow color. Therefore, prior amber glass is restricted to darker shades. If it is desired to increase durability, as by reducing the alkali content and increasing the lime content of prior amber glass, blistering and foaming results, making necessary the addition of more iron such as iron sulfide. But this makes the glass objectionably dark.

While such additions of iron result in low ultraviolet transmission, they correspondingly reduce the transparency or transmission of visible light. Also, the concentration of iron is likely to vary and cause streaks of dark and light amber coloration.

Contrary to such accepted teachings of the prior art, I have discovered that reduced amber glass of exceptional stability may be produced through an unusually wide range of coloration within the limits of composition set forth below. Furthermore, I have discovered a most remarkable and novel relation between the alkali content and the silica content with respect to the effect of these constituents upon the stability of color and the coloration of reduced or carbon-sulfur amber glass. (The term "alkali" as used herein means either or any of the following: $Na_2O$, $K_2O$ and $Li_2O$).

The limits of composition of my novel glass are approximately as follows:

| | Per cent |
|---|---|
| Silica ($SiO_2$) | 70 –80 |
| Alkali | 10 –17.5 |
| CaO | 1.3 –13 |
| MgO | 0 – 6.5 |
| $Al_2O_3$ | 0.5 – 5 |
| Iron expressed as $Fe_2O_3$ | 0.02– 0.10 |

Balance selected from the following minor constituents: BaO, $B_2O_3$, S, $F_2$, $TiO_2$ and SrO.

The newly discovered relation between alkali and silica referred to above is that these constituents are required to be present within the above approximate limits in such proportions that the percentage of silica by weight minus twice the percentage of alkali by weight equals K, a constant ranging in number from 45–60 inclusive. Stated otherwise, and letting S represent silica and N alkali, then $$S-2N=K$$

K being a constant dependent upon the amounts of coloring agents used and having a value ranging from 45 to 60, inclusive.

Thus, with the same proportions of carbon and sulfur, K being 45 for example, the same color is obtained within the above limits of composition and in which the above described proportions of silica and alkali are present. By increasing K, the color intensity is increased and by decreasing K, the color intensity is decreased without changing the proportions of carbon or other reducing agent and sulfur or sulfur compound, used as coloring material. In this way, intensity of coloration may be controlled and stabilized through an unusually wide range and stability is maintained for surprisingly long periods of time. This discovery makes it unnecessary to depend solely upon unstable coloring materials for control of color intensity or to add iron in any form to obtain color stability.

Examples of my novel glass and their K values are set forth in Table I and examples of my novel batch composition for producing the compositions of Table I are set forth in Table II, the corresponding glass compositions and batches being identified by the letters A, B, C, D and E, respectively.

TABLE I

Compositions of amber glass

| Oxide | A | B | C | D | E |
|---|---|---|---|---|---|
| $SiO_2$ | 70.0 | 73.0 | 76.0 | 80.0 | 79.0 |
| $Al_2O_3$ | 3.5 | 1.0 | 3.0 | 3.0 | 2.0 |
| CaO | 7.3 | 12.3 | 5.9 | 4.9 | 1.3 |
| MgO | 5.2 | 0.2 | 0.1 | 0.1 | 0.0 |
| BaO | 1.0 | | | | |
| $Na_2O, K_2O$ | 12.0 | 13.0 | 14.0 | 10.0 | 17.0 |
| $B_2O_3$ | | 0.5 | | | |
| $CaF_2$ | 1.0 | | 1.0 | 2.0 | 0.7 |
| $Fe_2O_3$ | 0.041 | 0.052 | 0.041 | 0.035 | 0.027 |
| K-value | 46 | 47 | 48 | 60 | 45 |

TABLE II

Batches for amber glass compositions of Table I

| Material | A | B | C | D | E |
|---|---|---|---|---|---|
| Sand | 200.0 | 200.0 | 200.0 | 200.0 | 200.0 |
| Soda ash | 55.3 | 60.5 | 61.2 | 38.5 | 73.5 |
| Limestone | | 64.3 | 31.8 | 25.0 | 6.3 |
| Raw Dolomite | 79.8 | | | | |
| Nepheline Syenite | 48.8 | | 35.0 | 35.0 | 23.2 |
| Feldspar | | 12.3 | | | |
| Barytes | 5.0 | | | | |
| Borax | | 3.9 | | | |
| Fluorspar | 3.5 | | 3.0 | 5.9 | 2.0 |
| Powdered Charcoal | 1.0 | 0.6 | 0.8 | 0.8 | 0.8 |
| Sulfur | | 0.8 | 1.0 | 1.0 | 1.0 |

In Table I, the percentages of constituents were calculated from analyses of the raw materials with the exception of the iron content which was determined by chemical analysis.

It will be noted from Tables I and II that no iron compound is specified in the batch and that the iron content of the glass compositions is limited to the prescribed maximum of approximately 0.10% (expressed as $Fe_2O_3$), which, in prior amber glasses may be as high as 0.40%.

Contrary to the belief in the prior art that the substantial addition of iron is necessary for the production of carbon-sulfur ambers, good strong amber coloration has been obtained in glass made according to this invention and containing less than 0.05% ($Fe_2O_3$).

Table I omits the percentages of S and C which are present in the glass in small amounts, corresponding to the amounts present in the batch as shown by Table II. Sulfur is derived from the barytes of Example A, Table II, and in general, may be derived from any suitable sulfur compound such as a sulfate or a sulfide, excluding iron compounds.

Fluorine, also present in small amount in most of the examples, is as a matter of convenience expressed as calcium fluoride and if introduced, may be incorporated in any suitable form of fluoride other than fluorspar, if desired. The use of a fluoride is preferred because of its effectiveness as a fining agent and color intensifier in the glass and batch of this invention. Also, I have discovered that introducing fluorine in reduced amber glass decreases the transmission of ultraviolet light. However, as shown by Example B, Tables I and II, the invention is not limited to glass containing fluorine or to a batch containing a fluoride.

If a fluoride is used, not less than 10 pounds of fluorspar or its equivalent in fluoride content per 1000 lbs. of sand is necessary to intensify color but no advantage is obtained in using more than 30 pounds per 1000 lbs. of sand. Therefore, the preferred content of fluorspar is 10 to 30 lbs. per 1000 lbs. of sand or the equivalent content of other suitable fluoride.

The amount of sulfur by weight preferably equals or exceeds the amount of carbon by weight in the batch. The powdered charcoal may be replaced by such other reducing agents as powdered coal, graphite or powdered aluminum. I have found that a reduction in ultraviolet transmission is obtained by increasing the amount of carbon without a corresponding decrease in transmission of visible light such as occurs with addition of iron.

In producing my novel glass, the compositions described above may be varied or changed, in the proportions of carbon and sulfur or in sulfur content, in accordance with the depth of color desired and such operating conditions as size of furnace, furnace atmosphere and temperature, without departing from the invention or discovery.

No oxidizing agents are present in the examples of Tables I and II.

The batch and glass of the examples are easy to melt and fine and may be produced in ordinary furnaces at temperatures ranging from approximately 2500 to approximately 2900° F. without blistering or foaming. The glass remains stable over long periods of time at furnace temperatures.

The stability of my novel glass makes possible for the first time the production of reduced or carbon-sulfur amber glass through a wide range of color including light shades, characterized by attractive golden or golden tinted yellow or golden red coloration. This contrasts sharply with prior amber glass which is too unstable to permit very much lightening of color and which, when lightening is attempted, has an unattractive dull green-yellow color. Also, my novel glass is distinguished from prior amber glass by increased transparency and a red cast which are desirable characteristics, the attainment of which is substantially inhibited in prior amber glass by the presence of iron (expressed as $Fe_2O_3$) in excess of 0.10%.

More specifically stated my novel glass compares favorably with, or shows marked improvement over, prior amber glass with regard to light transmitting properties. Spectral transmission data reveals that my novel glass may have a sufficiently low transmission of ultraviolet light to adequately protect the contents of containers composed of it and a relatively high transmission of visible light which permits the contents to be seen and attainment of a definite and pleasing red cast. Thus, glass embodying my invention or discovery may have a higher efficiency with respect to the ratio of visible to ultraviolet transmission or may be more efficient in transmitting visible light than prior amber glass. Also, glass of my invention may have as low a transmission of ultraviolet light as prior amber glass.

The low ultraviolet transmission of reduced amber glass of my invention or discovery is remarkable in three respects: first because attained without the addition of iron to the batch, that is, with the low content of iron (expressed as $Fe_2O_3$) specified above, which results in the improved transmission of visible light and in coloration as explained above; second, because of the discovery that ultraviolet transmission can be reduced by the addition of carbon and without the addition of iron as in prior amber glass; third, because of the discovery that ultraviolet transmission can be reduced by introducing fluorine into amber glass of the reduced or carbon-sulfur type.

My discoveries also make possible for the first time the production of reduced or carbon-sulfur amber glass of good chemical durability in light shades or of good transparency to visible light without danger of loss of color or of blistering and foaming in melting and fining. Example D is representative of this accomplishment.

Having thus described my invention or discovery, what I claim is:

1. An amber glass of the reduced type containing sulfur as colorizing material and comprising by weight 70–80% $SiO_2$, 10–17.5% alkali, 1.3–13% CaO iron expressed as $Fe_2O_3$ not exceeding 0.10% and a small amount of fluorine, said glass having a K value of 45–60 where K equals the percentage of $SiO_2$ minus twice the percentage of alkali.

2. An amber glass of the reduced type containing sulfur as colorizing material and comprising by weight approximately 70–80% $SiO_2$, 10–17.5% alkali, 1.3–13% CaO, 0 to 6.5% MgO, 0.5–5% $Al_2O_3$, iron expressed as $Fe_2O_3$ not exceeding 0.10% and the balance minor constituents selected from the class consisting of BaO, $B_2O_3$, $F_2$, $TiO_2$ and SrO, said glass having a K value of 45–60 where K equals the percentage of $SiO_2$ minus twice the percentage of alkali.

3. An amber glass of the reduced type containing carbon and sulfur and comprising 70–80% $SiO_2$, 10–17.5% alkali, 1.3–13% CaO, 0–6.5% MgO, 0.5–5% $Al_2O_3$, 0.02–0.10% iron expressed as $Fe_2O_3$, and a small amount of fluorine, and having a K value of 45–60 where K equals the percentage of $SiO_2$ minus twice the percentage of alkali.

4. A batch for making a reduced amber glass comprising sand, alkali, calcia and alumina bearing minerals, a reducing agent and sulfur, and a fluoride, said ingredients being so selected and proportioned as to form a glass of the desired coloration containing approximately by weight 70–80% $SiO_2$, 10–17.5% alkali, 1.3–13% CaO, iron expressed as $Fe_2O_3$ not exceeding 0.10% and a small amount of fluorine, and having a K value of 45–60 where K equals the percentage of $SiO_2$ minus twice the percentage of alkali.

5. A batch for making a reduced amber glass comprising sand, alkali, calcia, sulfur, a reducing agent and alumina bearing minerals, said ingredients being so selected and proportioned as to form amber glass of the desired coloration containing approximately by weight 70–80% $SiO_2$, 10–17.5% alkali, 1.3–13% CaO and iron expressed as $Fe_2O_3$ not exceeding 0.10% and wherein an iron compound as a stabilizer and fining agent is replaced by further proportioning said ingredients so that the percentage of $SiO_2$ minus twice the percentage of alkali equals 45–60 and by the addition to the batch of a small amount of fluoride.

AARON K. LYLE.

REFERENCES CITED

The following references are of record in the file of this patent:

UNITED STATES PATENTS

| Number | Name | Date |
| --- | --- | --- |
| 1,830,902 | Hood | Nov. 10, 1931 |
| 2,056,627 | Smelt | Oct. 6, 1936 |
| 2,303,779 | West | Dec. 1, 1942 |
| 2,367,871 | Kalsing et al. | Jan. 23, 1945 |

FOREIGN PATENTS

| Number | Country | Date |
| --- | --- | --- |
| 142,393 | Switzerland | 1930 |

OTHER REFERENCES

S. R. Scholes, Modern Glass Practice (1937), page 47.

Eitel et al., Glastechnische Tabellen (1932), pages 636 and 697.